United States Patent Office 3,413,346
Patented Nov. 26, 1968

3,413,346
2-(2-HALOETHYLAMINO)-5-HALO-
BENZOPHENONES
Rodney Ian Fryer, North Caldwell, Earl Reeder, Nutley, and Leo Henryk Sternbach, Upper Montclair, N.J., assignors to Hoffmann-La Roche Inc., Nutley, N.J., a corporation of New Jersey
No Drawing. Filed Jan. 19, 1966, Ser. No. 521,539
3 Claims. (Cl. 260—570)

The present invention relates to novel chemical processes. More particularly, the present invention relates to novel chemical processes for preparing known compounds useful as medicinal agents by virtue of their pharmacological activity and to novel intermediates useful in such preparative techniques.

The known end products which result from a performance of the novel processes disclosed in the subject application can be characterized broadly, in a chemical sense, as 1-methyl-7-halo-2,3-dihydro-5-phenyl-1,4-benzodiazepines and are of the formula

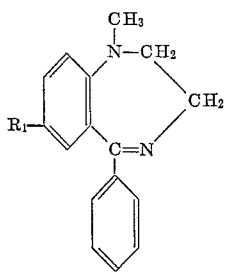

wherein $R_1$ is chlorine and bromine.

Especially preferred for the purposes of the present invention are compounds of the Formula I above wherein $R_1$ is chlorine.

Compounds of the Formula I above have been prepared heretofore by a process which involves methylating 1-unsubstituted-7-halo-2,3-dihydro-5-phenyl-1H-1,4-benzodiazepines. This preparative technique requires forming a sodio derivative of the said 1-unsubstituted compounds and thereafter reacting the so-formed sodio derivative with an alkylating agent such as dimethyl sulfate or methyl iodide. When proceeding in accordance with this preparative technique, it has been found that the desired 1-substituted compounds of the Formula I above do not result in yields of an order which would make this preparative approach attractive from a commercial point of view. The object of the present invention is to provide a facile method for obtaining the compounds of the Formula I above in high yields and of good quality, whereby a synthesis for preparing the compounds of the Formula I above suitable for commercial application is afforded. The said process for preparing compounds of the Formula I above involves, in its first stage, treating a compound of the formula

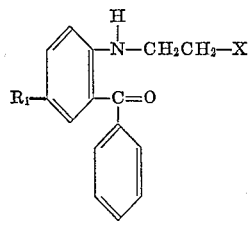

wherein $R_1$ is as above and X is selected from the group consisting of chlorine, bromine and iodine, with a methylating system comprising, as essential ingredients, formic acid and formaldehyde, whereby to prepare a compound of the formula

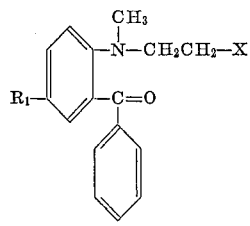

wherein $R_1$ and X are as above, and treating the so-formed compound of the Formula III above with ammonia whereby ring closure to the desired compound of the Formula I above occurs. Suitably, the ammonolysis is effected in the presence of an inert organic solvent such as a lower alkanol, e.g. ethanol, an ether such as dioxane, tetrahydrofuran, and the like.

Temperature and pressure are not critical features of the step of preparing compounds of the Formula III above or the subsequent step of converting same into a compound of the Formula I above and thus, these steps can be effected at room temperature or above room temperature or below room temperature. However, in an advantageous aspect, these steps are effected with the application of heat, e.g. at elevated temperatures.

In the treatment of compounds of the Formula III above with ammonia, intermediates of the formula

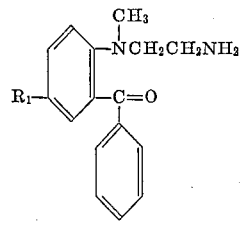

wherein $R_1$ is as above result.

The last-mentioned compounds are not isolated but are directly converted to the desired compounds of the Formula I above under the conditons prescribed in the ammonolysis step, i.e., the treatment of compounds of the Formula III above with ammonia.

Thus, the present invention provides a process which is eminently well-suited for commercial application since when performing same, there results the desired compounds of the Formula I above in good yields and of a high quality.

The starting compounds of the Formula II above can be prepared by several techniques. One such technique involves the hydrolysis of a compound of the formula

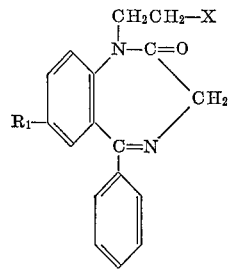

wherein $R_1$ and X are as above, with any suitable hydrolyzing agent. Representative of hydrolyzing agents suitable for the purposes of the present invention are mineral acids, e.g. hydrochloric acid and the like. Preferably, there is present during the hydrolysis step, a lower alkanol such as ethanol. Thus, in a preferred aspect, to effect the ring opening of a compound of the Formula IV above, an alkanolic solution of a mineral acid is employed, e.g. ethanolic hydrochloric acid.

Compounds of the Formula II above can also be formed by reacting tosyl group-containing aniline derivatives of the formula

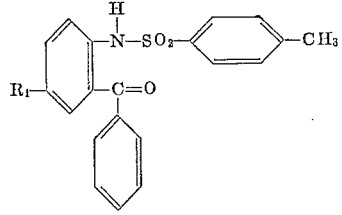

V wherein $R_1$ is as above, with a compound of the formula $$Y—CH_2CH_2—X$$

wherein X is as above and Y is selected from the group consisting of chlorine, bromine and iodine, e.g. 1,2-dichloroethane, 1,2-dibromoethane, 1-chloro-2-bromoethane and the like, preferably, after first replacing the hydrogen atom on the nitrogen atom of the compound of the Formula V above to which the tosyl group is joined with a sodio atom, utilizing, for example, sodium hydride, sodium methoxide and the like, to thereby prepare a compound of the formula

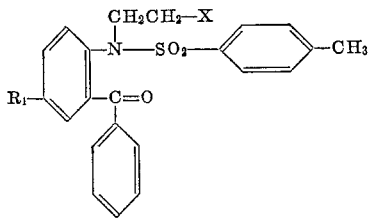

VI wherein $R_1$ and X are as above, and subsequently, splitting off the tosyl group. An efficacious way of removing the tosyl group whereby to prepare the corresponding compound of the Formula II above is heating a compound of the Formula VI above in the presence of a suitable proton-donating acid agent such as sulfuric acid and the like.

While the tosyl group is illustrated hereinabove as the leaving group of compounds of the Formulae V and VI above, it is, of course, to be understood that any equivalent leaving group such as another aryl sulfonyl group, e.g. benzene sulfonyl and the like or an acyl moiety such as acetyl and the like can be present in the compounds of the Formulae V and VI above in place of the tosyl group. Preferably, the leaving group is selected from the group consisting of acyl, benzene sulfonyl and derivatives thereof. However, all that is required of the leaving group is that it function efficaciously in this process aspect, that is, that it protect the aniline nitrogen atom during the alkylation step and further, that it be readily removable by conventional techniques.

The following examples are illustrative but not limitative of the present invention. All temperatures stated therein are in degrees centigrade.

EXAMPLE 1

A mixture of 82 g. (0.2 mole) of the sodium salt of 2-(p-tolylsulfonamido)-5-chlorobenzophenone and 144 g. (0.2 mole) of 1-bromo-2-chloroethane was stirred in 500 ml. of dimethylformamide overnight at 70–75°. The reaction mixture was poured into 1 liter of water and extracted with methylene chloride (3×200 mls.). The extracts were combined, washed first with 3 N sodium hydroxide, then with water and thereafter evaporated in vacuo to a glassy residue. The residue so obtained was allowed to stand at room temperature for about 30 days. Recrystallization from ether-petrol gave colorless waxy prisms of 5 - chloro - 2-(p-toluenesulfonyl-2-chloroethylamido)benzophenone, melting at 97–101°.

EXAMPLE 2

A solution of 10 g. (30 mmole) of 7-chloro-1-(2-chloroethyl) - 1,3 - dihydro - 5-phenyl-2H-1,4-benzodiazepin-2-one in 100 ml. of ethanol and 100 ml. of 3 N hydrochloric acid were refluxed with stirring over a period of 19 hours. The reaction mixture was poured into an iced excess of sodium hydroxide and extracted with methylene chloride. After washing the extract with water and removal of the methylene chloride by evaporation in vacuo gave a yellow oil. Chromatography over an alumina (Woelm neutral, Act 1) column and passing petrol through the column gave 5-chloro-2-(2-chloroethylamino)benzophenone in the petrol eluent. Upon crystallization and recrystallization from methylene chloride-hexane, the product appeared as yellow prisms, melting point 88–90°.

EXAMPLE 3

To the 5-chloro-2-(p-toluenesulfonyl-2-chloroethylamido)benzophenone (0.2 mole) prepared in Example 1, there was carefully added 200 ml. of concentrated sulfuric acid. The resultant medium was stirred for 30 minutes and 30 mls. of water were then carefully added. The so-formed mixture was stirred at 100° for 40 minutes, then cooled to room temperature and allowed to stand overnight. The reaction mixture was poured over 1 kg. of ice and the solution neutralized with potassium hydroxide. The resulting potassium sulfate was removed by filtration, the precipitate washed with methylene chloride and the filtrate extracted several times with methylene chloride. The methylene chloride washings and the methylene chloride extracts were combined, washed several times with water and evaporated in vacuo to 5-chloro-2-(2-chloroethylamino)benzophenone as a yellow oil which crystallized on standing, melting point 85–90°.

EXAMPLE 4

A solution of 27.6 g. (94 mmole) of 5-chloro-2-(2-chloroethylamino)benzophenone in 200 ml. of 98–100% formic acid was treated with 25 g. of paraformaldehyde. The so-formed reaction mixture was stirred at 61° for 18 hours. The formic acid was removed by evaporation in vacuo at 55° and the residue treated with 200 ml. of iced 3 N sodium hydroxide. Extraction of the resulting mixture with methylene chloride and removal of the methylene chloride by evaporation left an orange oil. The oil was dissolved in 500 ml. of ether and 100 ml. of benzene and the so-formed reaction medium was extracted with three 125 ml. portions of cold 5 N hydrochloric acid. The acid extracts were combined, washed with benzene, neutralized with potassium hydroxide and extracted with methylene chloride. The methylene chloride extract was washed with water, combined with benzene and reduced by evaporation in vacuo to 5-chloro-2-(2-chloroethylmethylamino) benzophenone as an orange oil, B.P. 175–178°/0.2 mm.

EXAMPLE 5

A mixture of 41 g. (0.1 mole) of the sodium salt of 2-(p-tolylsulfonamido)-5-chlorobenzophenone, 94 g. (0.5 mole) of 1,2-dibromoethane and 350 ml. of dimethylformamide was stirred overnight at 75°. The reaction mixture was poured into 1 liter of water and extracted several times with methylene chloride (3× 200 mls.). The combined extracts were washed first with 10 N sodium hydroxide and then with water. The so-washed extracts were evaporated in vacuo to a glassy residue. The residue upon crystallization and recrystallization from ether-hexane gave colorless prisms of 5-chloro-2-(p-toluenesulfonyl-2-bromoethylamido)benzophenone, melting at 114–116°.

EXAMPLE 6

The 5-chloro-2-(p-toluenesulfonyl-2-bromoethylamido)benzophenone (0.1 mole) from Example 5 was added with stirring to 150 ml. of concentrated sulfuric acid. Thereafter, 50 ml. of water was carefully added. The reaction mixture was stirred for 30 minutes at reflux and then poured into iced potassium hydroxide. The precipitate which formed was removed by filtration. Air drying of the precipitate gave yellow needles of 2-(2-bromoethylamino)-5-chlorobenzophenone of melting point 90–95°. Recrystallization from ethanol-water gave the product as yellow needles melting at 92–94°.

EXAMPLE 7

A solution of 21 g. (62 mmole) of 2-(2-bromoethylamino)-5-chlorobenzophenone was stirred into 200 ml. of 98–100% formic acid. 20 g. of paraformaldehyde was then added and the reaction mixture turned dark red. The reaction mixture was stirred overnight (18 hours) at 61°. Formic acid was removed by evaporation in vacuo at 55° and the residue treated with 200 ml. of 3 N sodium hydroxide. The mixture was extracted with methylene chloride and the methylene chloride extract was reduced by evaporation in vacuo to a yellow oil which was dissolved in 300 ml. of 5 parts ether : 1 part benzene and extracted with cold 5 N hydrochloric acid. The acid extracts were combined, washed with benzene, neutralized with sodium hydroxide and extracted with methylene chloride. The methylene chloride extract was washed with water and reduced by evaporation in vacuo to 2-(2-bromoethylmethylamino)-5-chlorobenzophenone.

EXAMPLE 8

A mixture of 10 g. (32.5 mmole) of 5-chloro-2-(2-chloroethylmethylamino)benzophenone, 10 g. (67 mmole) of sodium iodide and an excess of ammonia in 25 ml. of ethanol was placed in a sealed container, heated to 85° and shaken for 10 hours. The reaction mixture was evaporated in vacuo to a red gum which was partitioned between 1 N sodium hydroxide and benzene. The benzene layer was extracted with three 50 ml. portions of 1 N hydrochloric acid. The acidic extracts were combined, washed with benzene and made basic with sodium hydroxide. Extraction with benzene and removal of the solvent by evaporation in vacuo gave a crystalline residue of 7-chloro - 2,3 - dihydro-1-methyl-5-phenyl-1H-1,4-benzodiazepine, melting at 100–103°.

EXAMPLE 9

A solution of 2.6 g. (7.35 mmole) of 2-(2-bromoethylmethylamino)-5-chlorobenzophenone in 200 ml. of ethanol saturated with ammonia was capped and allowed to stand at room temperature over the weekend. The solvent was removed by evaporation in vacuo leaving a red gummy residue which was partitioned between 1 N sodium hydroxide and benzene. The benzene layer was separated and extracted with three 50 ml. portions of 1 N hydrochloric acid. The acidic extracts were combined, washed with benzene and made basic with sodium hydroxide. Extraction with benzene and removal of the solvent and water by evaporation in vacuo gave an oil which crystallized in petrol to give 7-chloro-2,3-dihydro-1-methyl-5-phenyl-1H-1,4-benzodiazepine, melting point 100–102°.

We claim:

1. A compound selected from the group consisting of compounds of the formula

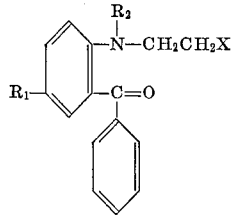

wherein:
$R_1$ is selected from the group consisting of chlorine and bromine;
$R_2$ is selected from the group consisting of hydrogen and methyl; and
X is selected from the group consisting of chlorine, bromine and iodine.

2. A compound as defined in claim 1 wherein $R_2$ is hydrogen.

3. A compound as defined in claim 1 wherein $R_2$ is methyl.

References Cited

UNITED STATES PATENTS 3,121,077  2/1964  Keller et al. _____ 260—239.3
3,182,054  5/1965  Sternbach et al. _____ 260—239

CHARLES B. PARKER, *Primary Examiner.*

ROBERT V. HINES, *Assistant Examiner.*